United States Patent [19]
Yamamoto

[11] 3,777,963
[45] Dec. 11, 1973

[54] CARRY-OUT CARRIAGE DEVICE OF PEELING MACHINE

[75] Inventor: Akira Yamamoto, Komatsu, Japan

[73] Assignee: Kabushiki Kaisha Komatsu Seisakusho, Tokyo, Japan

[22] Filed: Oct. 27, 1972

[21] Appl. No.: 301,299

[30] Foreign Application Priority Data
Oct. 29, 1971  Japan.............................. 46/100111

[52] U.S. Cl................... 226/145, 226/150, 269/34, 269/218
[51] Int. Cl............................................. B23q 3/08
[58] Field of Search.................... 226/145, 146, 149, 226/150, 163, 164, 25, 27, 30, 31, 32, 34; 269/218; 83/452, 461

[56] References Cited
UNITED STATES PATENTS

| | | | |
|---|---|---|---|
| 2,269,754 | 1/1942 | Bernhardt et al................ | 269/34 X |
| 2,908,114 | 10/1959 | Fouse.............................. | 269/34 X |
| 3,113,508 | 12/1963 | Trachtman...................... | 269/32 X |
| 3,170,322 | 2/1965 | Cavanaugh..................... | 269/218 X |
| 3,386,726 | 6/1968 | Lorenz............................ | 269/218 X |

FOREIGN PATENTS OR APPLICATIONS
958,749   5/1964   Great Britain..................... 269/218

*Primary Examiner*—Allen N. Knowles
*Attorney*—James E. Armstrong

[57] ABSTRACT

A carry-out carriage device of a peeling machine which has a pair of clamper pads, a pair of clamper rods slidably supported in opposite directions against the feeding center of a blank and fixing the clamper pads at the respective opposite ends, a movable base, a pair of levers pivotally secured symmetrically with respect to the feeding center of the blank at the movable base side to the bases of the clamper rods at the opposite ends, a pair of rods rotatably connected to the intermediates of the levers at the opposite ends, a cylinder device having a piston and a piston rod coaxially rotatably connected to the other ends of the rods to operate in the direction perpendicular to the operational direction of the clamper rods.

4 Claims, 3 Drawing Figures

CARRY-OUT CARRIAGE DEVICE OF PEELING MACHINE

This invention relates to a peeling machine, and more particularly to a carry-out carriage device of a peeling machine for rotatably cutting continuously the outer periphery of various bar blank.

The peeling machine forcibly feeds bar blanks continuously fed onto a blank supply loader with a blank feeding device composed of plural feed rollers so as to cut rotatably the outer peripheral surface of the blank by rotating cutters meanwhile. The carry-out carriage disposed at the rear side of the cutters of the peeling machine subsequently cuts rotatably the blanks at the rest part after fed out of the feed rollers of the blank feeding device so as to clamp the part already cut of the blank at the rear of the cutters to draw out the blanks.

Generally, in the carry-out carriage device of this type of the peeling machine, the larger the diameter of the blank to be clamped becomes, the greater the cutting interference of the blank becomes so that the reaction force of the cutter is increased, and accordingly, the clamp force adapted for a predetermined diameter of the blank must be larger proportionally as the diameter of the blank becomes larger, but in the conventional carry-out carriage of the peeling machine, since the lever is connected directly to the cylinder and piston side of a hydraulic cylinder device, the clamp force by the clamper is constant, and accordingly, even if the diameter of the blank becomes larger, the clamp force cannot be strengthened. Therefore, if the clamp force is met to the large diameter of the blank, it becomes excessively strong in case of small diameter of the blank with the result that the blank tends to be scratched, while if the clamp force is met to the small diameter of the blank, it becomes excessively weak in case of large diameter of the blank to slip as its disadvantages.

It is, therefore, an object of the present invention to eliminate the aforementioned disadvantages of the conventional carry-out device of a peeling machine, and to provide a novel and improved carry-out device of a peeling machine which provides automatically a clamp force adapted for the diameter of the blank without slipping in case of both large and small diameter of the blank.

It is another object of the present invention to provide a carry-out device of a peeling machine which draws out the blank from the cutters of the machine without scratching the blank.

According to one aspect of the present invention, there is provided a carry-out carriage device of a peeling machine which comprises a pair of clamper pads, a pair of clamper rods slidably supported in opposite directions against the feeding center of a blank and fixing the clamper pads at the respective opposite ends, a movable base, a pair of levers pivotally secured symmetrically with respect to the feeding center of the blank at the movable base side to the bases of the clamper rods at the opposite ends, a pair of rods rotatably connected to the intermediates of the levers at the opposite ends, a cylinder device having a piston and a piston rod coaxially rotatably connected to the other ends of the rods to operate in the direction perpendicular to the operational direction of the clamper rods.

The other objects, features and advantages of the present invention will become apparent from the following description taken in conjunction with the accompanying drawings, in which.

Figure 1:
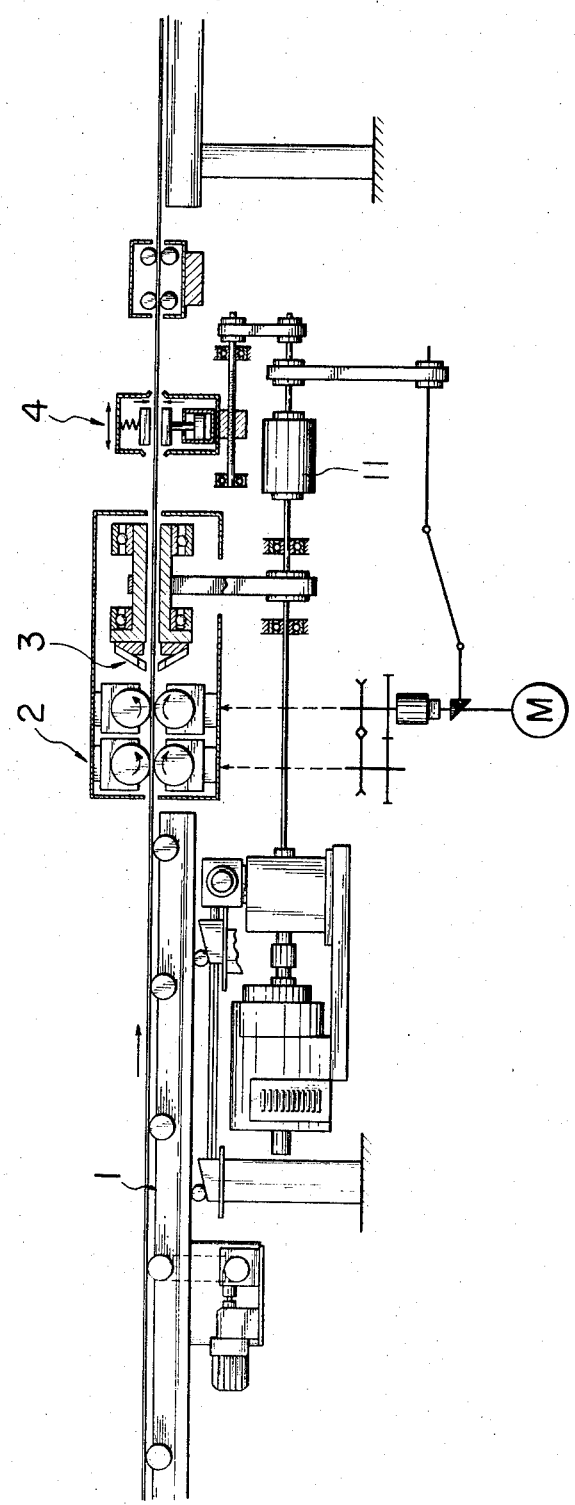
FIG. 1 is a structural view for explaining the peeling machine applied with the carry-out carriage device of the present invention.

As shown in FIG. 1, the peeling machine forcibly feeds bar blanks continuously fed onto a blank supply loader 1 with a blank feeding device 2 composed of plural feed rollers in rightward direction of the drawing, meanwhile cutting rotatably the outer peripheral surface of the blank by rotating cutters 3. Numeral 4 represents the carry-out carriage disposed at the rear side of the cutters 3 of the peeling machine which subsequently cuts rotatably the blanks at the rest part of the blank after fed out of the feed rollers of the blank feeding device 2 so as to clamp the part already cut of the blank at the rear of the cutters 3 to draw out the blanks.

Figure 2:
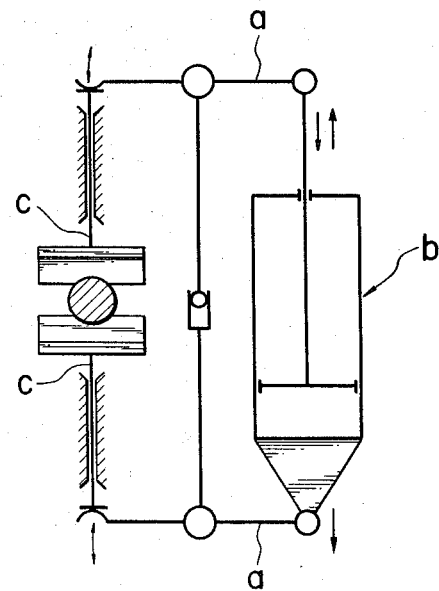
FIG. 2 is a structural view of the conventional carry-out device of the conventional peeling machine.

This invention relates to improvements of the carry-out carriage device of a peeling machine. That is, generally the carry-out carriage device of this type of the peeling machine, the larger the diameter of the blank to be clamped becomes, the greater the cutting interferene of the blank becomes so that the reaction force of the cutter is increased, and accordingly the clamp force adapted for a predetermined diameter of the blank must be larger proportionally as the diameter of the blank becomes larger, but as shown in FIG. 2, in the conventional carry-out carriage of the peeling machine, since a lever a is connected directly to the cylinder and piston side of a hydraulic cylinder device b, the clamp force by a clamper c is constant, and accordingly even if the diameter of the blank becomes larger, the clamp force cannot be strengthened. Therefore, if the clamp force is met to the large diameter of the blank, it becomes excessively strong in case of small diameter of the blank with the result that the blank tends to be scratched, while if the clamp force is met to the small diameter of the blank, it becomes excessively weak in case of large diameter of the blank to slip as its disadvantages.

Figure 3:
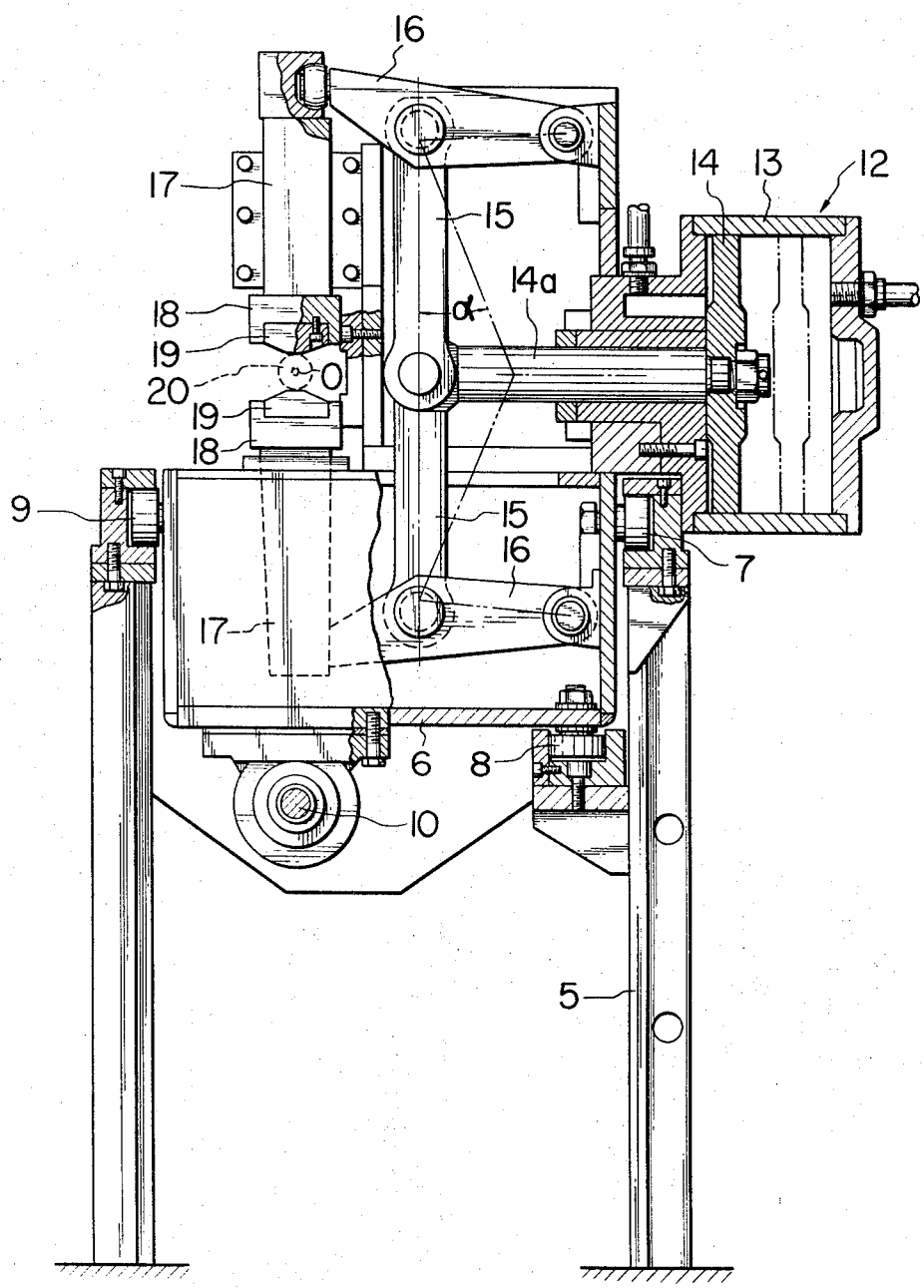
FIG. 3 is a fragmentary front view of one embodiment of the carry-out carriage device of the peeling machine of the present invention.

Referring now to FIG. 3, which shows one embodiment of the carry-out carriage device of a peeling machine, numeral 5 represents a frame on which a movable base 6 is movably rested through rollers 7, 8 and 9. 10 shows a feed screw for moving the movable base 6 driven through a feeding transmission 11 as shown in FIG. 1. Numeral 12 illustrates a cylinder device secured coaxially with the feeding center position of the blank to the movable base 6, and one respective ends of the rods 15 and 15 are elevationally symmetrically secured pivotally to the end of the piston rods 14a of the piston 14 engaged within the cylinder 13 of the cylinder device 12. Numeral 16 and 16 are levers pivotally secured at the base to the movable base 6 elevationally symmetrically and secured pivotally at the intermediate portion to the repective one ends of the rods 15 and 15, and pivotally secured to the bases of the clamper rods 17 and 17 slidably supported elevtionally symmetrically to the ends of the levers 16 and 16. Clamper pads 19 and 19 composed of resilient material such as hard rubber, etc. are fixed through bearing members 18 and 18 to the opposite ends of the clamper rods 17 and 17.

The opposite center O of the clamper rods 17 and 17 is corresponded to the cutting center of the blank.

In operation of thus constructed carry-out carriage device of this invention, when hydraulic fluid is acted onto the cylinder device 12, the piston 14 operates to move laterally in the drawing so that the levers 16 and 16 are rocked elevationally symmetrically through the rods 15 and 15 pivotally secured to the ends of the piston rod 14a by the lateral movement of the piston 14 with the result that the blank 20 disposed at the opposite center O of the clamper rods 17 and 17 is clamped or umclamped.

In the above case, an angle $\alpha$ between the rods 15 and 15, and the connecting line of both ends of the rods 15 and 15 in case to clamp the blank 20 is small when the diameter of the blank 20 to be clamped is large, and is large when it is small. Theefore, even if the operating force of the piston 14 is the same in the relationship between the rods 15 and 15, and the levers 16 and 16, the clamp force is large when the diameter of the blank 20 is large, and is small when it is small.

In the above embodiment, the cylinder device 12 is laterally provided and the clamper rods 17 and 17 are operated elevationally, but the cylinder device 12 may be longitudinally provided so that the clamper rods 17 and 17 are operated in lateral direction within the scope of this invention.

It should be understood from the foregoing description that since the carry-out carriage of the present invention comprises a pair of clamper pads 19 and 19, a pair of clamper rods 17 and 17 slidably supported in opposite directions against the feeding center of a blank and fixing the clamper pads 19 and 19 at the respective opposite ends, a movable base 6, a pair of levers 16 and 16 pivotally secured symmetrically with respect to the feeding center of the blank at the movable base side to the bases of the clamper rod 17 and 17 at the opposite ends, a pair of rods 15 and 15 rotatably connected to the intermediates of the levers 16 and 16 at the opposite ends, a cylinder device 12 havng a piston and a piston rod coaxially rotatably connected to the other ends of the rods 15 and 15 to operate in the direction perpendicular to the operationl direction of the clamper rods 17 and 17, the clamp force adapted for the diameter of the blank to be clamped is automatically obtained so as to draw out the blank from the cutters without slippage in case of either the blank of smaller diameter or larger diameter and without scratches to carry-out the blank.

I claim:

1. A carry-out carriage device of a peeling machine comprising a pair of clamper pads, a pair of clamper rods slidably supported in opposite directions against the feeding center of a blank and fixing said clamper pads at the respective opposite ends, a movble base, a pair of levers pivotally secured symmetrically with respect to the feeding center of the blank at said movable base side to the bases of said clamper rods at the opposite ends, a pair of rods rotatably connected to the intermediates of said levers at the opposite end, a cylinder means having a piston and a piston rod coaxially rotatably connected to the other ends of said rods to operate in the direction perpendicular to the operational direction of said clamper rods.

2. A carry-out carriage device as set forth in claim 1, wherein said clamper pads are made of resilient material and are fixed through bearing members to the opposite ends of said clamper rods.

3. A carry-out carriage device as set forth in claim 1, wherein said cylinder means are laterally provided so that the clamper rods are operated elevationally.

4. A carry-out carriage device as set forth in claim 1, wherein said cylinder means are longitudinally provided so that the clamper rods are operated in lateral direction.

* * * * *